United States Patent
Bergman et al.

(10) Patent No.: US 10,547,364 B2
(45) Date of Patent: Jan. 28, 2020

(54) QUASI CO-LOCATION FOR BEAMFORMING

(71) Applicant: Telefonaktiebolaget LM Ericsson (publ), Stockholm (SE)

(72) Inventors: Svante Bergman, Hägersten (SE); Mattias Frenne, Uppsala (SE); George Jöngren, Sundbyberg (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/578,592

(22) PCT Filed: Sep. 27, 2017

(86) PCT No.: PCT/SE2017/050939
§ 371 (c)(1),
(2) Date: Nov. 30, 2017

(87) PCT Pub. No.: WO2018/063065
PCT Pub. Date: Apr. 5, 2018

(65) Prior Publication Data
US 2018/0331860 A1 Nov. 15, 2018

Related U.S. Application Data

(60) Provisional application No. 62/402,516, filed on Sep. 30, 2016.

(51) Int. Cl.
*H04B 7/06* (2006.01)

(52) U.S. Cl.
CPC .................. *H04B 7/0617* (2013.01)

(58) Field of Classification Search
CPC . H04L 25/0228; H04L 5/0091; H04L 5/0048; H04L 5/0023; H04B 17/327; H04B 7/0617; H04B 7/0854
See application file for complete search history.

(56) References Cited

U.S. PATENT DOCUMENTS

| 9,635,642 B2 * | 4/2017 | Lee ..................... H04W 72/04 |
| 2007/0142004 A1 * | 6/2007 | Yokoi ................... H04B 7/0684 455/121 |

(Continued)

OTHER PUBLICATIONS

Ertel et al, "Overview of Spatial Channel Models for Antenna Array Communication Systems" IEEE Personal Communications, pp. 10-22 (Year: 1998).*

(Continued)

*Primary Examiner* — Jean B Corrielus
(74) *Attorney, Agent, or Firm* — Baker Botts, LLP

(57) ABSTRACT

A method implemented in a user equipment (UE) includes receiving a first reference signal (RS) from a first transmit antenna port and performing channel estimation based on the first RS. The method also includes obtaining an indication that the first RS and a second RS share a spatial property and receiving the second RS from a second transmit antenna port. The method further includes inferring the shared spatial property for the second RS based on the indication and performing channel estimation based on the second RS using the inferred spatial property.

28 Claims, 10 Drawing Sheets

(56) References Cited

U.S. PATENT DOCUMENTS

| | | | | |
|---|---|---|---|---|
| 2007/0230639 A1* | 10/2007 | Stirling-Gallacher | ...................... | H04B 7/0408 375/347 |
| 2013/0201840 A1* | 8/2013 | Sorrentino | .......... | H04L 25/0204 370/252 |
| 2014/0036800 A1* | 2/2014 | Frenne | .................. | H04L 5/0035 370/329 |
| 2014/0198763 A1* | 7/2014 | Sorrentino | ............. | H04B 7/024 370/330 |
| 2015/0304001 A1* | 10/2015 | Tomeba | ................... | H04B 7/04 375/267 |
| 2016/0072572 A1 | 3/2016 | Kang et al. | | |

OTHER PUBLICATIONS

PCT Notification of Transmittal of the International Search Report and the Written Opinion of the International Searching Authority, or the Declaration for International application No. PCT/SE2017/050939—dated Nov. 23, 2017.

3GPP TSG RAN WG1 Meeting #86; Gothenburg, Sweden; Source: Huawei, HiSilicon; Title: Evaluation of the Impact of QCL Assumptions and Discussion on Potential QCL Configurations (R1-167199)—Aug. 22-26, 2016.

* cited by examiner

US 10,547,364 B2

QUASI CO-LOCATION FOR BEAMFORMING

PRIORITY

This nonprovisional application is a U.S. National Stage Filing under 35 U.S.C. § 371 of International Patent Application Serial No. PCT/SE2017/050939 filed Sep. 27, 2017, and entitled "Quasi Co-Location For Beamforming" which claims priority to U.S. Provisional Patent Application No. 62/402,516 filed on Sep. 30, 2016, the entirety of which is hereby incorporated by reference.

TECHNICAL FIELD

The present disclosure relates, in general, to wireless communications and, more particularly, to quasi co-location frameworks.

BACKGROUND

One of the principles guiding the design of the long-term evolution (LTE) system is transparency of the network to the user equipment (UE). For example, the UE is able to demodulate and decode its intended channels without specific knowledge of scheduling assignments for other UEs or network deployments.

For example, different downlink control information (DCI) messages on an enhanced physical downlink control channel (ePDCCH) may be transmitted from ports belonging to different transmission points. Even though there are several reasons for serving a UE with control signaling from different points, one application includes distributing parts of the scheduling algorithm at different points, such that, e.g., downlink (DL) transmissions are associated to a different point than uplink (UL) transmissions. In such a case, it makes sense to schedule DL and UL transmissions with control signaling provided directly from the respective points.

A further application includes serving a UE with parallel data transmissions from different points, e.g., for increasing data rate or during handover between points. A further application consists of transmitting system control information from a "master" point and relying on data transmission from other points, typically associated to pico nodes.

In all the above applications it makes sense to have the possibility to serve the UE with control signaling on ePDCCH from different points in the same subframe. In each case, UEs are not aware of the geographical location from which each reference signal (RS) port is transmitted.

Demodulation reference signal (DMRS) or UE specific RS are employed for demodulation of data channels and possibly certain control channels (e.g., ePDCCH). UE specific RS relieves the UE from having to know many of the properties of the transmission and thus allows flexible transmission schemes to be used form the network side. This is referred to as transmission transparency (with respect to the UE). A problem is however that the estimation accuracy of UE specific RS may not be good enough in some situations.

Geographical separation of RS ports implies that instantaneous channel coefficients from each port towards the UE are in general different. Furthermore, even the statistical properties of the channels for different ports and RS types may be significantly different. Example of such statistical properties include the received power for each port, the delay spread, the Doppler spread, the received timing (e.g., the timing of the first significant channel tap), the number of significant channel taps, the frequency shift. In LTE, nothing can be assumed about the properties of the channel corresponding to an antenna port based on the properties of the channel of another antenna port. This is an important aspect of maintaining transmission transparency.

Based on the above observations, the UE should perform independent estimation for each RS port of interest for each transmission. This results in occasionally inadequate channel estimation quality for certain RS ports, leading to undesirable link and system performance degradation.

In LTE, reference signals used for channel estimation are denoted as antenna ports. Hence, the UE can estimate the channel from one antenna port by using the associated reference signal (RS). One could then associate a certain data or control transmission with an antenna port (e.g., the UE may use the RS for that antenna port to estimate the channel used to demodulate the associated control or data channel). The data or control channel may be transmitted using that antenna port.

In LTE, the concept of quasi-co location has been introduced to improve the channel estimation performance when demodulating control or data channels. The UE may estimate long term channel properties from one reference signal in order to tune its channel estimation algorithm. For instance, the average channel delay spread can be estimated using one antenna port and used when demodulating a data channel transmitted using another antenna port. If this is allowed, it is specified that the first and second antenna port are quasi co-located (QCL) with respect to average channel delay spread.

Hence, as used in LTE specifications, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (e.g., timing of a first significant channel tap), a number of significant channel taps, and frequency shift. By performing channel estimation algorithm tuning based on the RSs corresponding to the quasi co-located antenna ports, a quality of the channel estimation is substantially improved.

In current LTE specification, and according to working assumptions for new radio(s) (NR), a UE is not allowed to use measurements from one reference signal to assist in the reception or processing of another signal unless explicitly specified. The reason for this rule is that both the network and UE should have a common understanding on the relation between all reference signals and signals, to avoid situations where a UE is dependent on a relation between reference signals that the network might break without knowing.

As the UE is not allowed to make assumptions between reference signals that are not explicitly specified, it is not possible to allow UEs to improve the spatial receiver processing of one signal based on a previous reception of a previous signal.

The notion of quasi co-location (QCL) is introduced in LTE, and is under consideration for NR, to enable a way for a UE to use specific properties of one reference signal to assist in the processing of another signal. But QCL parameters for LTE only concern scalar entities that cannot directly be used for multi-dimensional spatial receiver processing.

The current QCL framework in LTE is designed for single input and single output channels in mind and lacks capability to take into account multi-antenna transmission, particularly for a large number of transmit and receive antennas. Moreover, how to handle high carrier frequencies and the use of beamforming together with QCL is a problem.

SUMMARY

By complementing the QCL framework with new channel parameters, the disclosure provides a mechanism for a network to identify to a receiving (RX) node that it can use channel parameters that depend on spatial properties, in particular spatial channel correlation parameters, estimated from a first reference signal, to improve the reception and/or processing of a second signal.

To address the foregoing problems with existing solutions, disclosed is a method in a receiving node. The method includes receiving reference signals (RSs) in a first set of one or more RSs from at least one transmit antenna port and performing channel estimation based on the received RSs in the first set. The method also includes obtaining an indication that the first set of RS and a second set of one or more RSs share at least one spatial property and receiving RSs in the second set of RSs from at least one transmit antenna port. The method further includes performing channel estimation based on the received RSs in the second set and under an assumption that the at least one spatial property is shared, as per the obtained indication.

Also disclosed is a receiving node comprising a receiver, a transmitter, a processor (which includes processor circuitry) and a memory storing instructions executable by the processor for: receiving, using the multi-antenna receiver, reference signals (RSs) in a first set of one or more RSs from at least one transmit antenna port, performing channel estimation based on the received RSs in the first set, obtaining an indication that the first set of RS and a second set of one or more RSs share at least one spatial property, receiving, using the receiver, RSs in the second set of RSs from at least one transmit antenna port, and performing channel estimation based on the received RSs in the second set and under the assumption that the at least one spatial property is shared, as per the obtained indication.

Also disclosed is a method implemented in a transmit node configured to transmit RSs from a plurality of antenna ports. The method includes obtaining an indication that a first set of one or more reference signals (RSs) and a second set of one or more RSs share at least one spatial property, configuring antenna ports in accordance with said indication, and transmitting RSs in each of the first and second sets.

Also disclosed is a transmit node comprising a multi-antenna transmitter, a processor (which includes processor circuitry) and a memory storing instructions executable by the processor for: obtaining an indication that a first set of one or more reference signals (RSs) and a second set of one or more RSs share at least one spatial property, configuring antenna ports in accordance with said indication, and transmitting RSs in each of the first and second sets.

Also disclosed is a method implemented in a user equipment (UE). The method includes receiving a first reference signal (RS) from a first transmit antenna port and performing channel estimation based on the first RS. The method also includes obtaining an indication that the first RS and a second RS share a spatial property and receiving the second RS from a second transmit antenna port. The method further includes inferring the shared spatial property for the second RS based on the indication and performing channel estimation based on the second RS using the inferred spatial property.

Further disclosed is a user equipment (UE) that includes a receiver, a transmitter, a processor, and a memory. The memory stores instruction executable by the processor to receive, using the receiver, a first reference signals (RS) from at least one transmit antenna port and to perform channel estimation based on the first RS. Furthermore, the instructions are executable to obtain an indication that the first RS and a second RS share a spatial property and to receive, using the receiver (410), the second RS from a second transmit antenna port. Also, the instructions are executable to infer the shared spatial property for the second RS and to perform channel estimation based on the second RS using the inferred spatial property.

Certain embodiments of the present disclosure may provide one or more technical advantages. For example, in certain embodiments, by complementing an existing QCL framework with new QCL parameters that depends on spatial channel properties, UE can perform spatial processing across different signal types without violating the rule that a UE is not allowed to use measurements from one reference signal to assist in the reception or processing of another signal unless explicitly specified. Examples of such spatial processing is analog receiver beamforming, and channel estimation using spatial processing gain to improve the channel estimate. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, on which.

DETAILED DESCRIPTION

Figure 1:
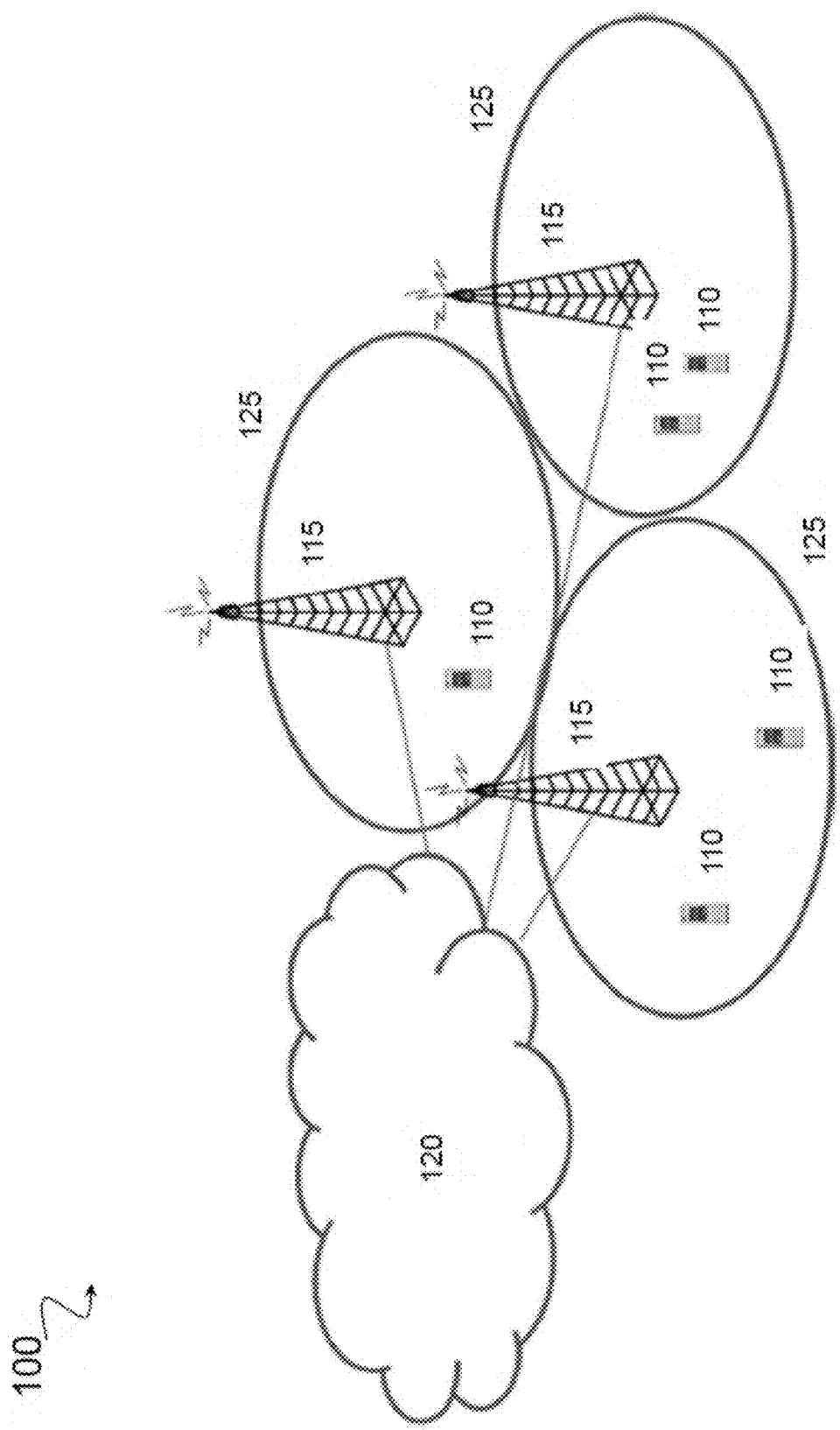
FIG. 1 is an illustration of an exemplary network, in accordance with certain embodiments.

As discussed above, in LTE and NR, quasi co-location (QCL) information involves scalar entities (also referred to as properties) but not spatial (e.g., multi-dimensional) properties. As a result, a UE cannot use that QCL information for multi-dimensional spatial receiver processing. This disclosure contemplates an unconventional QCL framework that includes QCL parameters that depend on spatial channel properties. A network can instruct a UE to use these channel parameters that depend on spatial properties to improve the reception and/or processing of a second signal. In this manner, the UE can perform spatial processing across different signal types without violating the rule that a UE is not allowed to use measurements from one reference signal to assist in the reception or processing of another signal unless explicitly specified. For example, the UE can perform analog receiver beamforming and channel estimation using spatial processing gain to improve the channel estimate.

This disclosure relates to the communication between two nodes in a network (such as network 100 shown in FIG. 1), a transmitter (TX) node and a receiver (RX) node (e.g., a user equipment (UE)). A TX node transmits a first set of reference signals (RS) from one or multiple transmit antenna ports. A RX node receives the transmitted reference signals using one or multiple receive antenna ports and determines or estimates, based on the received first set of transmitted RS, one or more parameters capturing a spatial property of the channel. The RX node determines an indication that a second set of transmitted RS from one or multiple transmit antenna ports are quasi co-located with the said first RS, where the QCL is given with respect to the one or more parameters capturing a spatial property of the channel. The TX node transmits the second set of transmit RS from one or multiple transmit antenna ports. The RX node utilizes one or more of the determined parameters capturing a spatial property of the channel that is based on the first set of RS, to assist in the reception of the second set of RS.

Receive antenna ports correspond to individual receive antennas, receiver radio chains, receiver base band processing units, etc. Hence, if a UE has two receive antenna ports, it has two receive antennas. However each receive antenna port can be connected to multiple or all physical receive antennas.

The indication of QCL described above, indicates that the two sets of RSs are QCL in the sense that one or more parameters capturing a spatial property may be (or be assumed) equal or approximately equal between the two. In some cases, this indication may hold only for particular instances of RS measurements, while in other cases the indication of QCL may apply over longer time periods. In some embodiments, the terms "first RS" and "second RS" could also mean "first set of RSs" and "second set of RSs" respectively. The second signal may be a reference signal used for channel state information (CSI) estimation in the RX node. In another embodiment the second signal is a data transmission, possibly accompanied by demodulation reference signals.

This disclosures contemplates parameters capturing spatial properties of the channel, for example, that the channel is represented by a multi-input multi-output (MIMO) channel. At least one of the receiver or transmitter may be equipped with more than one antenna element that can be controlled either in analog domain or digital domain.

In one embodiment, the transmission is performed from an antenna array with beamforming capability, and the signals may be precoded, beamformed, or non-precoded (e.g., the signal is transmitted from an antenna element or a fixed sub array).

Similarly, in one embodiment the receiving node is equipped with an antenna array with receiver filtering capability that could be all analog, analog digital reception, or all digital array reception.

In one embodiment, the spatial processing of the second signal includes filtering across receiver antennas, digital or analog receiver beamforming, or estimation of channel state information with spatially dependent parameters.

FIG. 1 is a diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as enhanced node Bs (eNBs) 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 4-8.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Determining an Indication—Examples

Some embodiments rely on the possibility to identify the reference signals, and in particular for the receiver to be able to establish the QCL relations between them.

In one embodiment, the first and the second reference signals are identifiable to the RX nodes. This could be accomplished, for instance, through signaling or configuration from a network node, or through a predetermined contract. In this process a first and a second identity index, respectively, are assigned to the reference signals. For example, these identities could be described as port numbers. In one case, the reference signals are identified through the detection of accompanying synchronization signals. The identity (ID) may be used to determine a configuration that points out the time frequency resources where the RS can be transmitted (for the transmitter) and received (for the receiver). For example, the relation between the first RS transmission and the second RS transmission is explicitly or implicitly dependent on the point in time where the two reference signals are transmitted. For instance, it can be explicitly specified that the first and the second RS are transmitted with a relative time or frequency offset.

In one case, the ID is persistent or semi-persistent so that multiple transmissions of RS at different times are identified though the same ID. In another case, the identity of an RS is established though an identity index combined with the point in time the transmission occurs, so that each RS transmission and/or reception has separate IDs. In yet another case, each RS that is transmitted or received is attributed with a separate ID. In a further embodiment, the ID consists of a semi-static ID and a timestamp, facilitating the ability to uniquely reference a RS transmission out of many.

The quasi co-location relations between reference signals can be dynamically signaled or configured by the network using the IDs to indicate a first and a second reference signal. In another embodiment the quasi co-location relation is specified in a predetermined contract between the TX node and the RX node.

In another embodiment, the QCL relation is indicated though a group index assigned to the reference signals, or to the reference signal IDs, where two transmitted reference signals are assumed to be QCL if they share the common group index. In one such embodiment the group index is denoted a beam index, reflecting the fact that QCL may depend on the transmission beam.

Channel Estimation—Examples

In this example, a system performs or improves the performance of the channel estimation based on the second RS. The first and the second RSs are non-precoded CSI-RS, used for CSI determination. The CSI determination may be subsequently used for CSI feedback, including channel quality indicator (CQI), and precoder matrix indicator (PMI), where the CSI feedback is transmitted in a reverse link from the RX node to the TX node.

In one embodiment, the spatial property of the channel is an estimate of the spatial correlation matrix of the channel. In another embodiment, the spatial property only includes a subset, a factor of, including a matrix factor of, or a linear combination of the elements of the spatial correlation matrix. Such subsets or factor of may include transmit-side spatial channel correlation, or receiver-side spatial channel correlation.

In one embodiment, the spatial property of the channel is used to determine a suitable spatial filter for improving the signal to noise ratio in the channel estimation algorithm. The filter could for instance be a matrix that select a signal subspace identified from the said spatial channel correlations. The spatial filter would then suppress the noise in the orthogonal complement of the signal subspace. Using such spatial filtering, a processing gain of the channel estimation can be attained. The filter could be based on parts of the eigenvector decomposition of the transmit-side spatial channel correlation, or similarly, the receiver-side spatial channel correlation matrix.

Figure 2A:
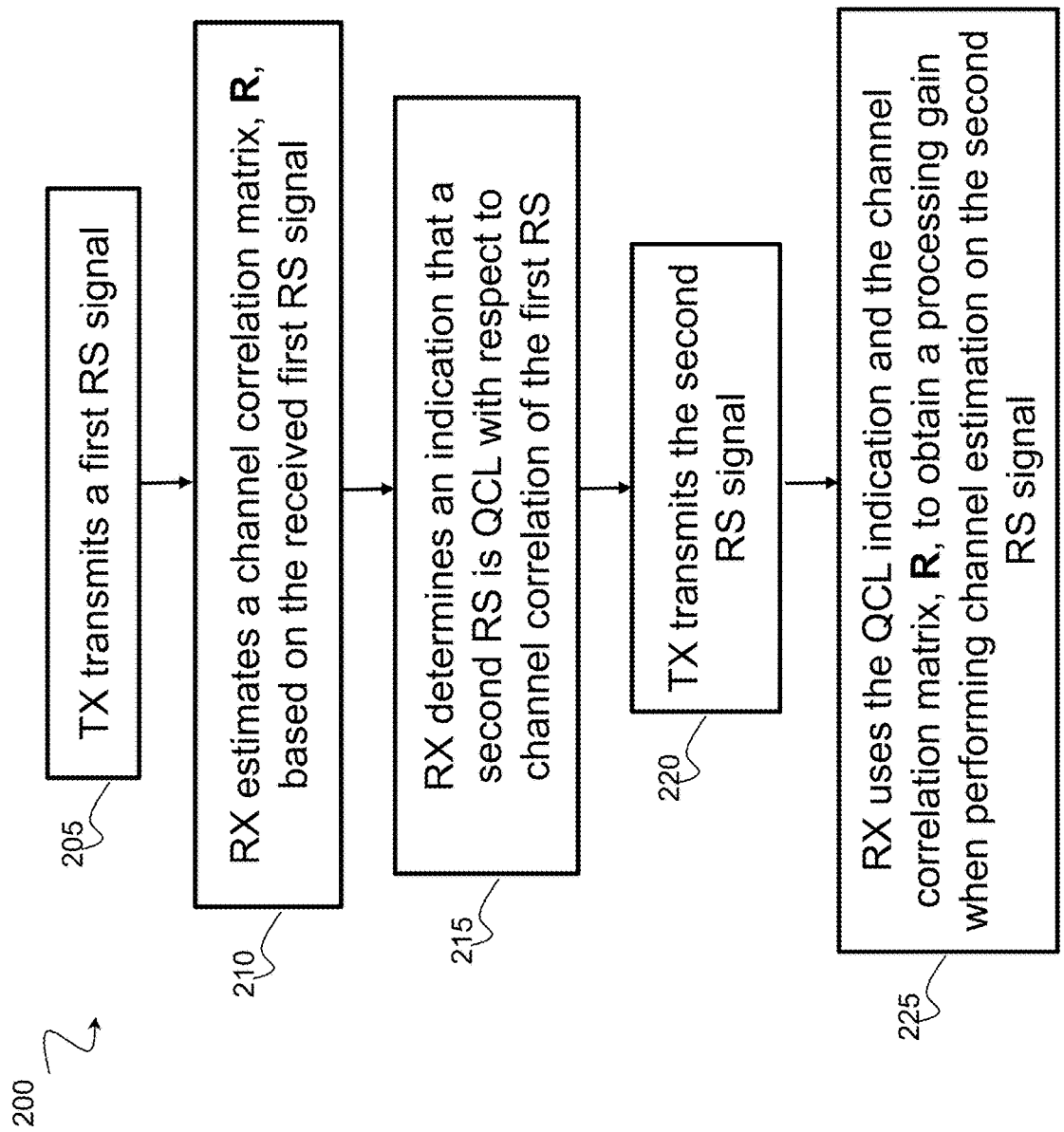
FIG. 2A is a flowchart illustrating a method of channel estimation, in accordance with certain embodiments.

FIG. 2A is a flowchart showing a method 200 for channel estimation. This disclosure contemplates one or more components of a telecommunications network or system performing the steps of method 200. In step 205, a transmitter node transmits a first RS signal. A receiver node estimates a channel correlation matrix, R, based on the received first RS signal in step 210. In step 215, the receiver node determines an indication that a second RS is QCL with respect to channel correlation of the first RS. The transmitter node transmits the second RS signal in step 220. In step 225, the receiver node uses the QCL indication and the channel correlation matrix, R, to obtain a processing gain when performing channel estimation on the second RS signal.

Figure 2B:
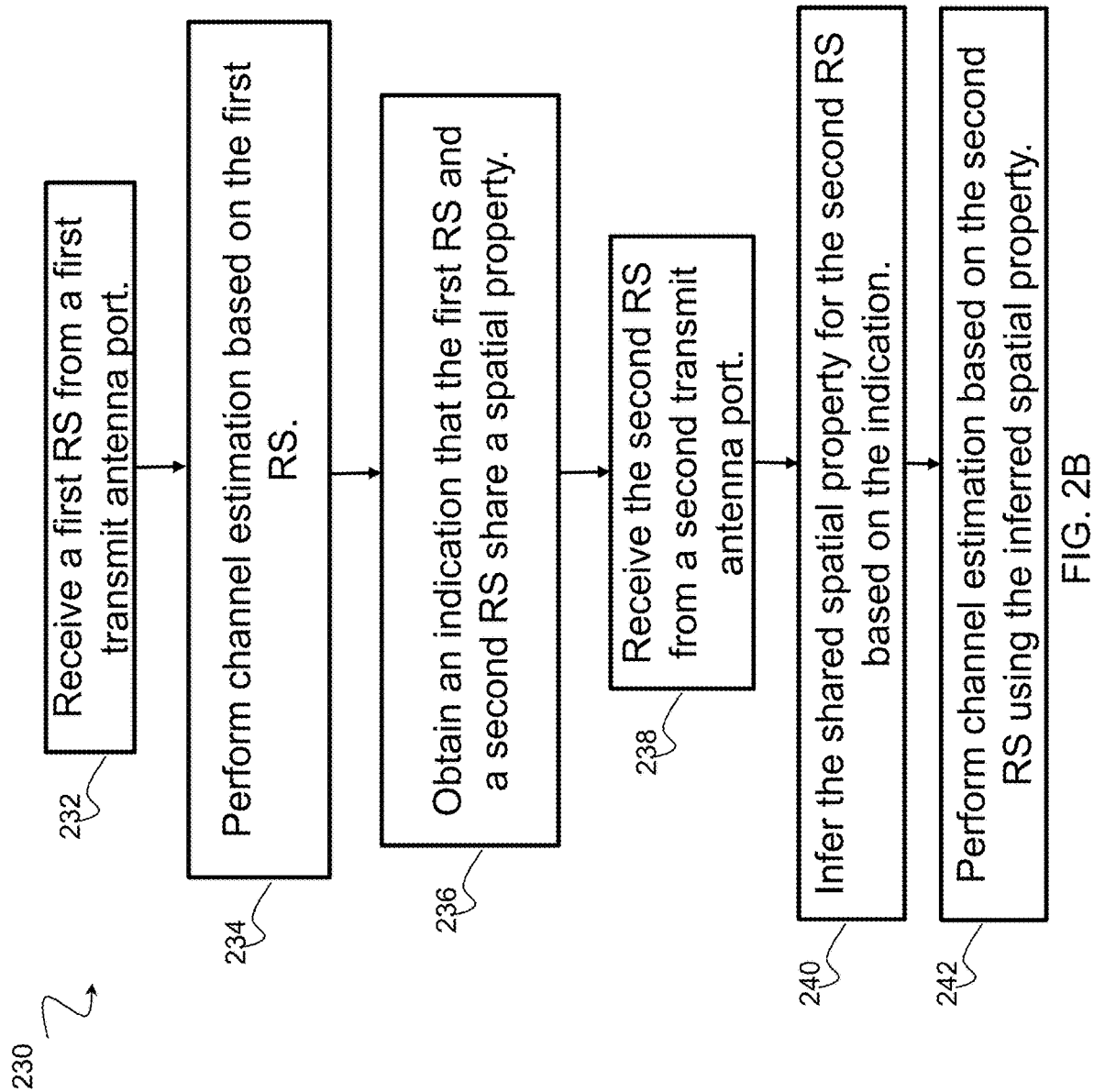
FIG. 2B is a flowchart illustrating a method of channel estimation, in accordance with certain embodiments.

FIG. 2B is a flowchart showing a method 230 for channel estimation. This disclosure contemplates one or more components of a telecommunications network or system performing the steps of method 230. In step 232, a receiver node (e.g., a UE) receives a first RS from a first transmit antenna port. The UE then performs a channel estimation based on the first RS in step 234. The network sends and the UE obtains an indication that the first RS and a second RS share a spatial property in step 236. The UE receives the second RS from a second transmit antenna port in step 238 and infers the shared spatial property from the second RS based on the indication in step 240. In step 242, the UE performs channel estimation based on the second RS using the inferred spatial property. In certain embodiments, the UE is able to assume that the two RSs share certain spatial properties when performing channel estimation.

Analog Beamforming—Examples

In this example, the RX node employs analog receiver beamforming, or analog digital hybrid beamforming. The first RS is transmitted using beamforming, with the number of RS ports being a positive integer. During the determining of parameters phase, the one or more parameters capturing a spatial property of the channel includes the determination of a metric that depends on a receive beam weight configuration. The metric can be an estimate of a subset or a linear combination of the spatial channel correlation between the receiver antenna elements. One such metric is the received power given a specific receive beam weight configuration. Naturally, for each receive beam weight configuration there is an associated metric.

The TX node may transmit the first RS multiple times allowing for the RX node to sweep different receiver beams while searching for the desired receive beam weight configuration. The RX node can then select the receiver beam that performs optimally in terms of the metric, with respect to receiving the said first RS.

During the determining of identification phase, the one or more parameters capturing a spatial property of the channel includes a subset or a linear combination of the spatial channel correlation, and in a more specific embodiment a receiver-side channel correlation matrix. The metric associated to a receiver beam may be a processed, or refined, version of the larger set of spatial channel correlations. The identification of QCL with respect to spatial channel correlations, therefore implies QCL with respect to the metric as a mathematical consequence, even though the receiver node does not explicitly derive the full spatial correlation parameters.

In one embodiment, the RX node determines an identification that the second RS is QCL with the first RS, with respect to spatial channel correlation parameters. Including a subset or linear combinations thereof. This implies that the RX node can assume that the beam-weight dependent metric, that is a function of the channel correlation parameters, are the same between the first RS and the second RS, and that the RX node may reuse the optimized receive beam weights for the reception of the second RS as was used for receiving the first RS, without having to resort to a new receiver beam sweep. Consequently, the step assisting in the processing of the second RS implies that the RX node utilizes the identified or optimized desired receive beam weight configuration that is determined based on the first RS to receive the second RS in certain embodiments.

Figure 3:
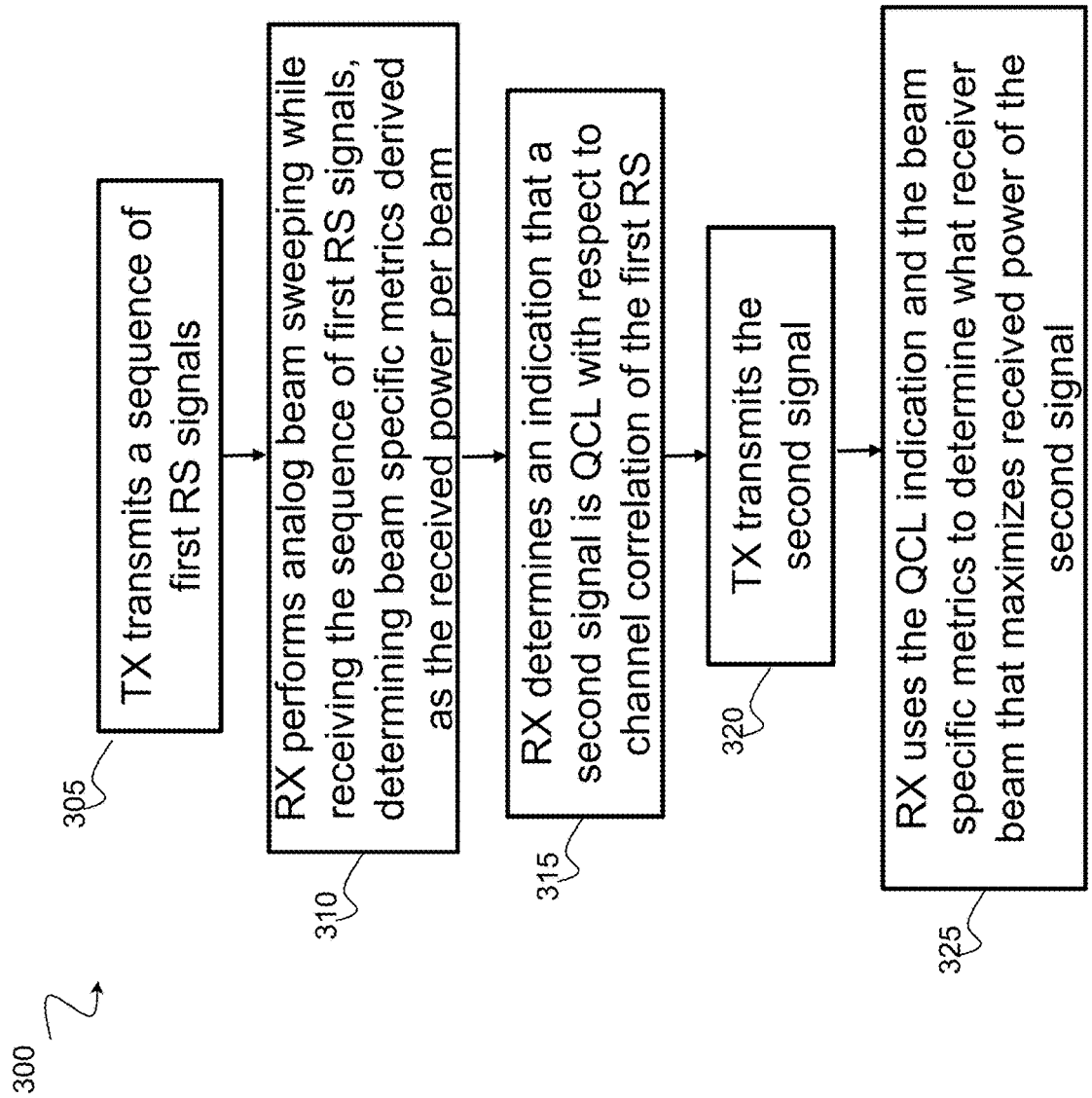
FIG. 3 is a flowchart illustrating a method of beamforming, in accordance with certain embodiments.

FIG. 3 is a flowchart showing a method 300 for beamforming. This disclosure contemplates one or more components of a telecommunications network performing the steps of method 300. In step 305, a transmitter node transmits a sequence of first RS signals. A receiver node performs analog beam sweeping while receiving the sequence of first RS signals, determining beam specific metrics derived as the received power per beam in step 310. In step 315, the receiver node determines an indication that a second signal is QCL with respect to channel correlation of the first RS. The transmitter node transmits a second signal in step 320. In step 325, the receiver node uses the QCL indication and the beam specific metrics to determine what receiver beam that maximizes received power of the second signal.

Network—Examples

Figure 4:
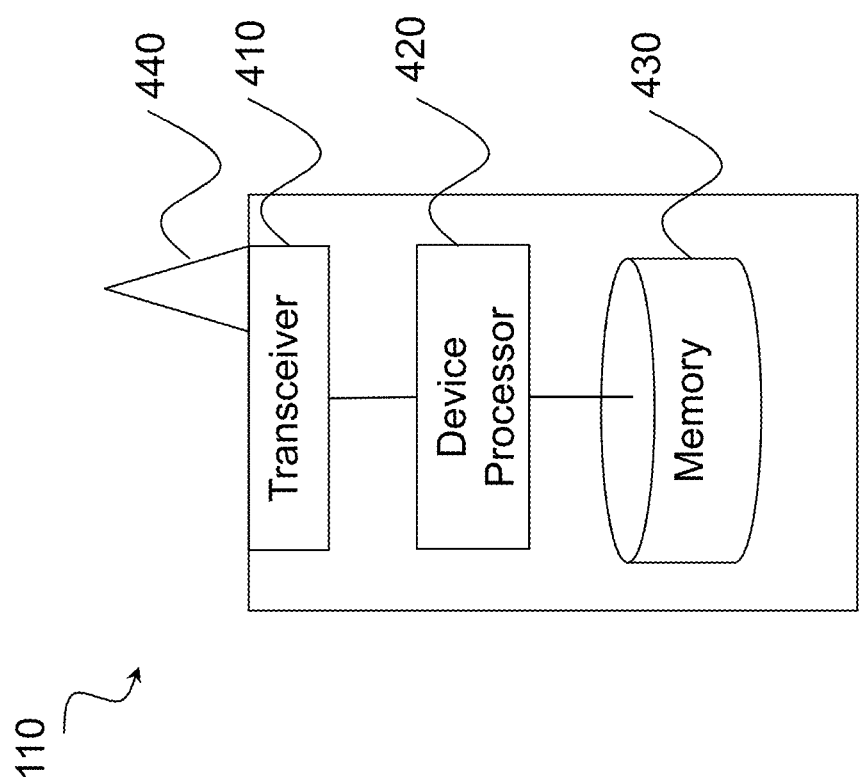
FIG. 4 is a block schematic of an exemplary wireless device, in accordance with certain embodiments.

FIG. 4 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 410, processor 420 (which includes processor circuitry), and memory 430. In some embodiments, transceiver 410 facilitates transmitting wireless signals to and receiving wireless signals from network node 115 (e.g., via antenna 440), processor 420 executes instructions to provide some or all of the functionality described above as being provided by wireless device 110, and memory 430 stores the instructions executed by processor 420.

Processor 420 may include any suitable combination of hardware and software implemented in one or more modules to execute instructions and manipulate data to perform some or all of the described functions of wireless device 110, such as the functions of wireless device 110 described above in relation to FIGS. 1-3. In some embodiments, processor 420 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 420.

Other embodiments of wireless device 110 may include additional components beyond those shown in FIG. 4 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 420. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
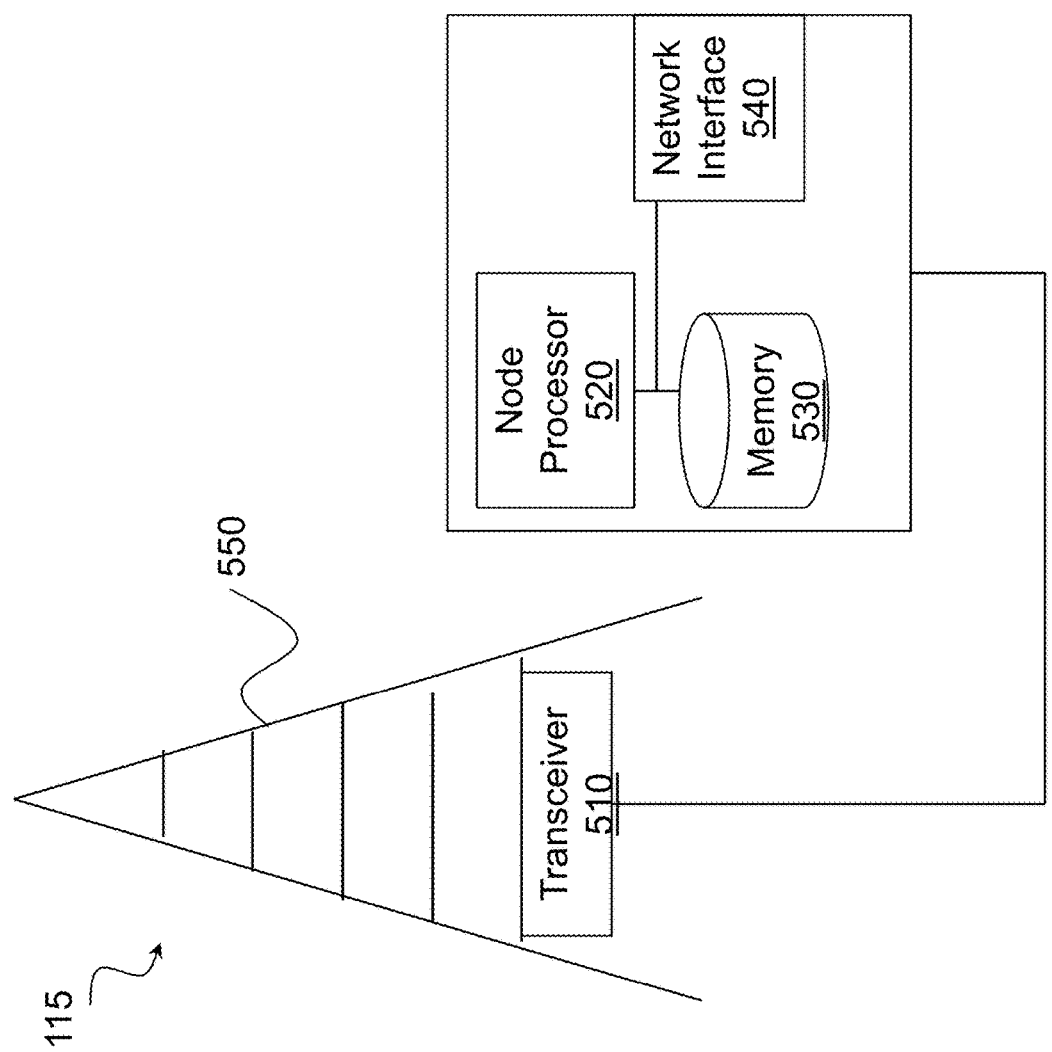
FIG. 5 is a block schematic of an exemplary network node, in accordance with certain embodiments.

FIG. 5 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 510, processor 520 (which includes processor circuitry), memory 530, and network interface 540. In some embodiments, transceiver 510 facilitates transmitting wireless signals to and receiving wireless signals from wireless device 110 (e.g., via antenna 550), processor 520 executes instructions to provide some or all of the functionality described above as being provided by a network node 115, memory 530 stores the instructions executed by processor 520, and network interface 540 communicates signals to backend network components, such as a gateway, switch, router, Internet, Public Switched Telephone Network (PSTN), core network nodes or radio network controllers, etc.

Processor 520 may include any suitable combination of hardware and software implemented in one or more modules to execute instructions and manipulate data to perform some or all of the described functions of network node 115, such as those described above in relation to FIGS. 1-4 above. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 115, send output from network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 115 may include additional components beyond those shown in FIG. 5 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 6:
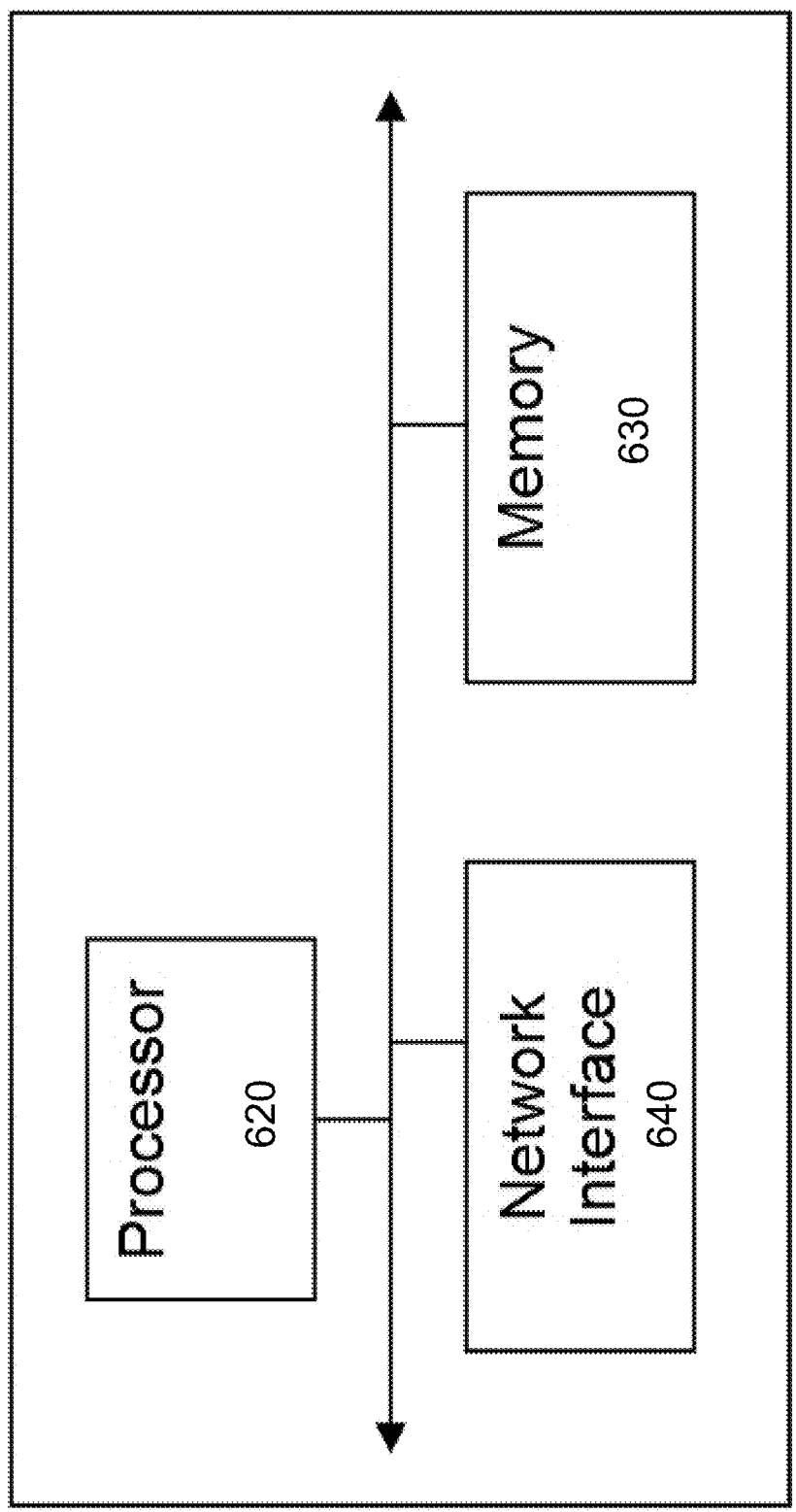
FIG. 6 is a block schematic of an exemplary radio network controller or core network node, in accordance with certain embodiments.

FIG. 6 is a block schematic of an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processor 620 (which includes processor circuitry), memory 630, and network interface 640. In some embodiments, processor 620 executes instructions to provide some or all of the functionality described above as being provided by the network node, memory 630 stores the instructions executed by processor 620, and network interface 640 communicates signals to any suitable node, such as a gateway, switch, router, Internet, Public Switched Telephone Network (PSTN), network nodes 115, radio network controllers or core network nodes, etc.

Processor 620 may include any suitable combination of hardware and software implemented in one or more modules to execute instructions and manipulate data to perform some or all of the described functions of the radio network controller or core network node. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

Figure 7:
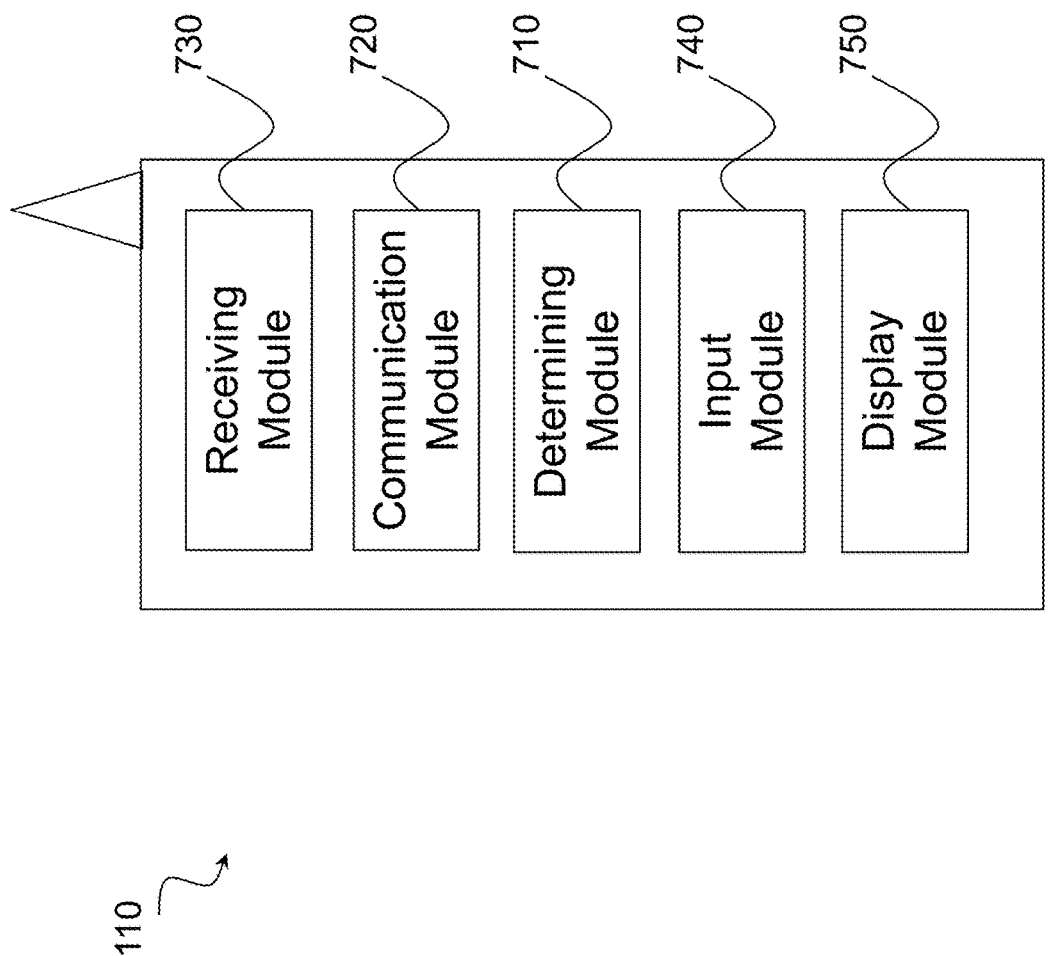
FIG. 7 is a block schematic of an exemplary wireless device, in accordance with certain embodiments.

FIG. 7 is a block schematic of an exemplary wireless device, in accordance with certain embodiments. Wireless device 110 may include one or more modules. For example, wireless device 110 may include a determining module 710, a communication module 720, a receiving module 730, an input module 740, a display module 750, and any other suitable modules. Wireless device 110 may perform the functions described above with respect to FIGS. 1-6.

Determining module 710 may perform the processing functions of wireless device 110. For example, determining module 710 may determine that first and second RS signals have been received. Determining module 710 may also determine an indication that a second signal is QCL with respect to channel correlation of the first RS signal. Determining module 710 may further perform channel estimation and beamforming sweeps. For example, determining module 710 may infer a spatial property based on the indication and perform channel estimation based on the second RS using the inferred spatial property. Determining module 710 may include or be included in one or more processors, such as processor 420 described above in relation to FIG. 4. Determining module 710 may include analog and/or digital circuitry configured to perform any of the functions of determining module 710 and/or processor 420 described above. The functions of determining module 710 described above may, in certain embodiments, be performed in one or more distinct modules.

Communication module 720 may perform the transmission functions of wireless device 110. Communication module 720 may transmit messages to one or more of network nodes 115 of network 100. Communication module 720 may include a transmitter and/or a transceiver, such as transceiver 410 described above in relation to FIG. 4. Communication module 720 may include circuitry configured to wirelessly transmit messages and/or signals. In particular embodiments, communication module 720 may receive messages and/or signals for transmission from determining module 710. In certain embodiments, the functions of communication module 720 described above may be performed in one or more distinct modules.

Receiving module 730 may perform the receiving functions of wireless device 110. As one example, receiving module 730 may receive first and second RS signals. Receiving module 730 may include a receiver and/or a transceiver, such as transceiver 410 described above in relation to FIG. 4. Receiving module 730 may include circuitry configured to wirelessly receive messages and/or signals. In particular embodiments, receiving module 730 may communicate received messages and/or signals to determining module 710.

Input module 740 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 710.

Display module 750 may present signals on a display of wireless device 110. Display module 750 may include the display and/or any appropriate circuitry and hardware configured to present signals on the display. Display module 750 may receive signals to present on the display from determining module 710.

Determining module 710, communication module 720, receiving module 730, input module 740, and display module 750 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

Figure 8:
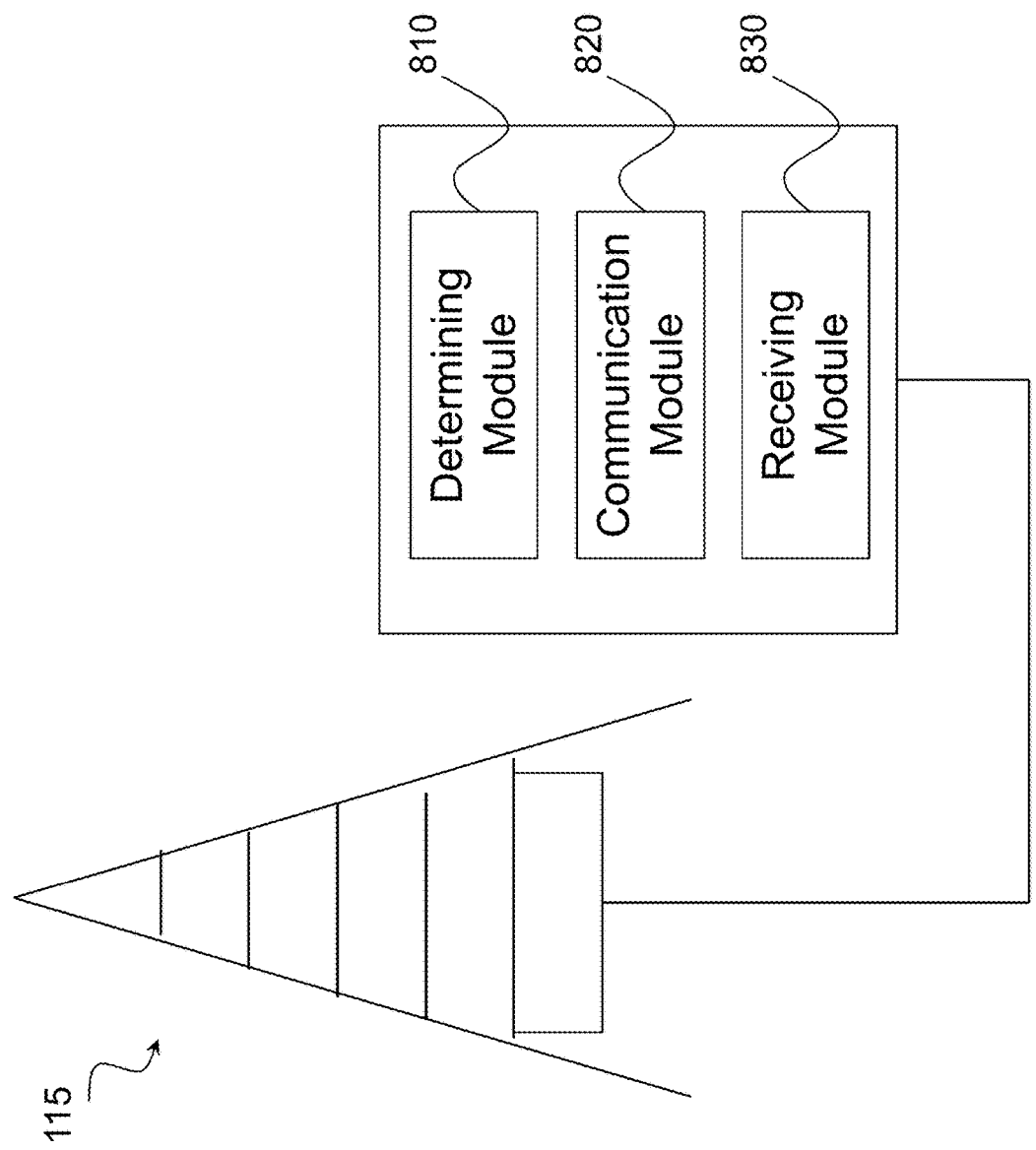
FIG. 8 is a block schematic of an exemplary network node, in accordance with certain embodiments.

FIG. 8 is a block schematic of an exemplary network node 115, in accordance with certain embodiments. Network node 115 may include one or more modules. For example, network node 115 may include determining module 810, communication module 820, receiving module 830, and any other suitable modules. In some embodiments, one or more of determining module 810, communication module 820, receiving module 830, or any other suitable module may be implemented using one or more processors, such as processor 520 described above in relation to FIG. 5. In certain embodiments, the functions of two or more of the various modules may be combined into a single module. Network node 115 may perform the functions described above with respect to FIGS. 1-7.

Determining module 810 may perform the processing functions of network node 115. For example, determining module 810 may determine when first and second RS signals should be transmitted. Determining module 810 may include or be included in one or more processors, such as processor 520 described above in relation to FIG. 5. Determining module 810 may include analog and/or digital circuitry configured to perform any of the functions of determining module 810 and/or processor 520 described above. The functions of determining module 810 may, in certain embodiments, be performed in one or more distinct modules. For example, in certain embodiments some of the functionality of determining module 810 may be performed by an allocation module.

Communication module 820 may perform the transmission functions of network node 115. As one example, communication module 820 may transmit first and second RS signals. Communication module 820 may transmit messages to one or more of wireless devices 110. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810 or any other module.

Receiving module 830 may perform the receiving functions of network node 115. Receiving module 830 may receive any suitable information from a wireless device. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810 or any other suitable module.

Determining module 810, communication module 820, and receiving module 830 may include any suitable configuration of hardware and/or software. Network node 115 may include additional modules beyond those shown in FIG. 8 that may be responsible for providing any suitable functionality, including any of the functionality described above and/or any additional functionality (including any functionality necessary to support the various solutions described herein).

NR—Examples

In certain 3GPP New Radio (NR) implementations, all physical channels and reference signals are transmitted using antenna ports. An antenna port is configured such that the channel over which a symbol on the antenna port is conveyed can be inferred from the channel over which another symbol on the same antenna port is conveyed. Parameters for an antenna port include at least average gain, average delay, delay spread, Doppler shift, and Doppler spread (similar to LTE). UE beamforming management may use QCL on these and other parameters. The DMRS antenna ports may be QCL-ed with each other. QCL may be performed across scheduled PRBs for a DM-RS antenna port. QCL may be performed among DM-RS antenna port groups. QCL of DMRS antenna ports may be performed with antenna ports of other reference signals. The antenna ports of demodulation reference signal (DM-RS) in NR may be used to transmit at least physical data and, possibly, control channels and used at the UE for demodulation. QCL assumptions that a UE is allowed to make among antenna ports are identified and explicitly specified. Two antenna ports are said to be quasi co-located if properties of the channel over which a symbol on one antenna port is conveyed can be inferred from the channel over which a symbol on the other antenna port is conveyed.

Figure 9:
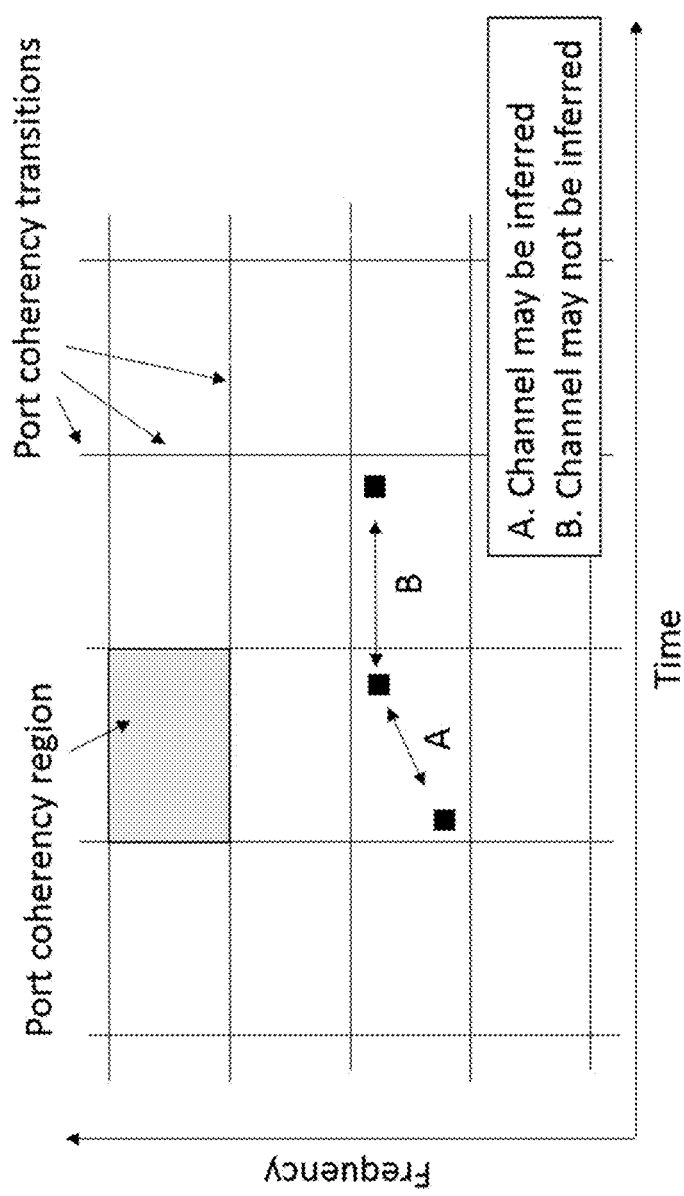
FIG. 9 is a graph showing frequency and time relationships with channel inferences.

Beam based operation introduces a new dimension to the NR antenna port definition. Transmitters with high gain beamforming capability may alter beamforming weight vectors for reference signals over time, e.g., similar to precoded CSI-RS in LTE. The event that the precoder of a precoded reference signal changes abruptly at some point in time can be denoted as a port coherency transition. A port coherency transition may occur when the precoder of a reference signal changes abruptly, so that the channel cannot readily be inferred between symbols across transition boundaries. Port coherency transitions are important in beam based operation, mainly because the transmitting node may update the precoder or beamforming weight vector of the reference signals as new channel state information becomes available. An example is beam tracking, where reference signals are updated over time to track a UE that is moving. Another case is for CSI-RS ports, where the resource is taken from a pool of resources, and the network decides to use the resource in another beam or from another TRP in a subsequent subframe. Port coherency transitions do not affect or violate the assumptions for antenna ports that for a symbol there should exist another symbol from which the channel can be inferred. It does not preclude that there exists yet another symbol conveyed on the same antenna port from which the channel cannot be inferred. However, any symbol is part of a port coherency region for which there are possibilities to mutually infer channel realizations between symbols. The relation between symbols, port coherency transitions and regions are illustrated in FIG. 9 that shows a time-frequency layout of a signal mapped to an antenna port. FIG. 9 illustrates how different symbols relate to each other depending on whether they are located in the same port coherency region or different. At port coherency transitions, the precoding or beamforming of the signal may change abruptly. One consequence is the existence of a port coherency region of symbols for which there are possibilities to mutually infer channel realizations between symbols.

Port coherency regions may be indirectly adopted in LTE. For instance, DMRS ports that have a port coherency region spanning one subframe in time and one precoder resource block group (PRG) in frequency. Another example is the CSI-RS measurements, that from LTE release 13 can be configured with measurement restrictions, effectively making the port coherency region the same as the CSI-RS periodicity in time, and the full bandwidth in frequency. Regardless if the port definition in NR includes the notion of a port coherency region, it may be directly or indirectly specified what assumptions the UE can make with respect to port coherency regions. In NR implementations, there may be a means for the UE to determine port coherency regions for all antenna ports known to the UE.

The notion of quasi co-location in NR may capture the effects of precoded or beamformed signals. Two antenna ports are said to be quasi co-located (QCL) if large scale properties of the channel over which a symbol on one antenna port is conveyed can be inferred from the channel over which a symbol on the other antenna port is conveyed.

Often, QCL does not apply to antenna ports mapping to different TRPs. Possible exceptions to this rule are SFN type of transmissions. Considering beam based operation, it is also not possible to assume QCL per default even when antenna ports map to the same TRP, as effective channels in different beam spaces may look very different. Beamforming may for example impact the average gain or delay spread of an effective channel.

Antenna ports mapping to the same transmission points may not necessarily be QCL. Similarly, as the precoder of a precoded antenna port may change on a port coherency transition event, an antenna port is not necessarily QCL with itself over different port coherency regions, but two sets of antenna ports may have port coherency regions that are mutually QCL, for instance if the precoder of the ports in the two coherency regions match. Likewise, an antenna port may not necessarily be QCL with itself over different port coherency regions. A port coherency region for one antenna port can be QCL with another port coherency region for another antenna port. Thus, QCL is not something that can be assumed per default, it is a relation between port coherency regions that should be signaled to the receiving node or known a-priori through specification. Hence, the definition of QCL may be refined to capture the effects of port coherency regions, as it is evident that antenna ports alone is not sufficient to describe QCL relations.

Beam management includes various forms of beam sweeping. A transmitter may repeatedly transmit a precoded reference signal to facilitate a receiving node to sweep and identify an optimal receiver beam. The UE can then use the optimized receiver beam for a later reception of a signal transmitted with the same precoder. For this to work, a mechanism and a specification language indicates to a UE that two reference signals are transmitted with the same precoder, e.g. beamformed 'in the same way.' The receiver may use the information that two different signals are transmitted from the same TRP with similar precoding to improve receiver processing, especially for analog reception.

Quasi co-location is a way to describe the relation between the two different signals originating from the same TRP and using the same precoder. The piece that is missing is a channel property that can be used by the receiver to allow for improved receiver processing. The channel property captures some sort of spatial distribution as it will be used for spatial receiver filtering. As an example, the UE should be able to assume it can use the same analog receive beam when receiving the two different signals using this property. Thus, spatial channel properties may be added to the list of QCL properties to facilitate various forms of analog receiver beamforming.

First order moments of channel realizations, such as amplitude and phase, are most likely too detailed and unpredictable to be used as QCL parameters. Parameters describing angle of arrival distributions are also not suitable as non-straightforward estimation algorithms capturing arbitrary receiver antenna arrays would be needed to accompany such QCL parameters. Second order statistics between antenna ports are simple and straightforward to estimate. For receiver purposes, it is often sufficient to use QCL assumption with respect to receiver side correlation of the channel. Thus, second order channel statistics are well-suited candidates for spatial QCL properties.

QCL with respect to receiver side channel correlation may be added to the list of QCL parameters. QCL with respect to channel correlation can also be useful for applications where the UE is expected to estimate a channel based on a reference signal with many ports, e.g., a non-precoded CSI-RS type of reference signal. Assuming the UE knows that a non-precoded CSI-RS is QCL with respect to channel correlation to a previously transmitted non-precoded CSI-RS (possibly with a higher pilot density), then it may use spatial channel correlations obtained from the previously transmitted CSI-RS to acquire spatial processing gain. In some instances, QCL with respect to transmitter side channel correlation or QCL with respect to spatial channel correlation in general may be added to the list of QCL parameters.

For nodes that have reciprocity-calibrated transmitter and receiver chains it may be useful to know when a signal that will be received is the reciprocal response to another signal that was transmitted earlier. That is, assuming a node with analog beamforming is transmitting a sounding reference signal with some analog beam. When receiving a response to the sounding it could expect the response to arrive through the reciprocal channel, for which the receiver beam could favorably be the same beam as was used for the reciprocal transmission. The QCL framework could be extended to also cover the use case of reciprocal responses for analog beamforming by defining the received signal to be reciprocally quasi co-located with the transmitted signal. The notion of reciprocally quasi co-located signals may be introduced to handle the case of reception of reciprocal responses to previous sounding for analog beamforming.

Differently from LTE, NR is expected to provide native support for sidelink (SL). Another difference compared to LTE is that MIMO capabilities are expected to be relevant also for SL in NR. The transmitter/receiver spatial processing used for sidelink is expected to be similar if not identical to the one used for the cellular interface, therefore, the QCL framework may include SL ports. A notable difference is that some devices may synchronize to a non-3GPP synchronization source (e.g., GNSS), which is a likely scenario, e.g., for V2X. In this case, it is useful to enable configurable QCL at least with respect to received timing and Doppler shift between NR ports and GNSS.

A further observation is that sidelink ports are not necessarily associated to a "UE ID." For example, sidelink reference signals (SLSS in LTE) and associated broadcast control channel transmissions (PSBCH in LTE) which are broadcasted in SFN fashion by multiple UEs. In this case, the QCL assumptions would refer to certain antenna ports which are not associated to unique UE ID and possibly not even to a cell ID. Thus, Sidelink antenna ports may be included in the QCL framework and external synchronization references such as GNSS may be included for QCL with respect to timing and frequency shift.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description may include:
AP Access Point
BS Base Station
BSC Base Station Controller
BTS Base Transceiver Station
CDM Code Division Multiplexing
CPE Customer Premises Equipment
CRS Cell Specific Reference Signal
CQI Channel Quality Indicator
CSI Channel State Information
CSI-RS Channel State Information Reference Signal
D2D Device-to-device
DAS Distributed Antenna System
DCI Downlink Control Information
DFT Discrete Fourier Transform
DL Downlink
DMRS Demodulation Reference Signal
eNB evolved Node B
EPDCCH Enhanced Physical Downlink Control Channel
FDD Frequency Division Duplex
LAN Local Area Network
LEE Laptop Embedded Equipment
LME Laptop Mounted Equipment LTE Long Term Evolution
M2M Machine-to-Machine
MAN Metropolitan Area Network
MCE Multi-cell/multicast Coordination Entity
MCS Modulation level and coding scheme
MIMO Multiple Input Multiple Output
MR Measurement Restriction
MSR Multi-standard Radio
MU-MIMO Multi-user MIMO
NAS Non-Access Stratum
NZP Non-Zero Power
OCC Orthogonal Cover Code
OFDM Orthogonal Frequency Division Multiplexing
PDCCH Physical Downlink Control Channel
PDSCH Physical Downlink Shared Channel
PMI Precoded Matrix Indicator
PRB Physical Resource Block
PSTN Public Switched Telephone Network
PUSCH Physical Uplink Shared Channel
PUCCH Physical Uplink Control Channel
RB Resource Block
RI Rank Indicator
RNC Radio Network Controller
RRC Radio Resource Control
RRH Remote Radio Head
RRU Remote Radio Unit
SU-MIMO Single User MIMO
TDD Time Division Duplex
TFRE Time Frequency Resource Element
TM Transmission Mode
UCI Uplink Control Information
UE User Equipment
UL Uplink
WAN Wide Area Network
ZP Zero-Power

The invention claimed is:

1. A method implemented in a user equipment (UE), comprising:
   receiving a first reference signal (RS) from a first transmit antenna port;
   performing channel estimation based on the first RS;
   obtaining an indication that the first RS and a second RS share a multi-dimensional spatial property;
   receiving the second RS from a second transmit antenna port;
   inferring the shared multi-dimensional spatial property for the second RS based on the indication; and
   performing channel estimation based on the second RS using the inferred multi-dimensional spatial property.

2. The method of claim 1, wherein the channel estimation based on the second RS includes duplicating a partial result of the channel estimation on the first RS.

3. The method of claim 1, wherein the channel estimation based on the second RS includes omitting a processing or measurement activity performed on the first RS.

4. The method of claim 1, wherein the channel estimations based on the first and second RSs are performed jointly.

5. The method of claim 1, wherein:
   the channel estimation based on the first RS comprises determining a value of a parameter representing a spatial property of a receiver; and
   the second RS is received while reusing the value.

6. The method of claim 1, wherein:
   the channel estimation based on the first RS comprises generating an estimation filter based on the shared at least one spatial property; and
   the channel estimation based on the second RS comprises applying the generated estimation filter.

7. The method of claim 1, wherein the indication is a co-location indication or a quasi-co-location indication.

8. The method of claim 1, wherein the indication is carried in a message received from a network node.

9. The method of claim 1, wherein the indication is pre-agreed.

10. The method of claim 1, wherein the at least one spatial property is selected from:
    a channel correlation parameter;
    a spatial correlation matrix of the channel;
    a receiver-side spatial correlation matrix of the channel;
    a factor of a spatial correlation matrix;
    a matrix factor of a spatial correlation matrix;
    a linear combination elements of a spatial correlation matrix;
    a non-scalar property;
    a metric representing a receive beam weight configuration; and
    a subset or a linear combination of the spatial channel correlation.

11. The method of claim 1, wherein performing channel estimation based on the first RS comprises estimating a channel correlation matrix based on the first RS.

12. The method of claim 1, further comprising obtaining a processing gain when performing channel estimation based on the second RS.

13. The method of claim 1, wherein the first RS is a synchronization signal or a signal to be used for CSI determination and the second RS is a signal to be used for CSI determination.

14. The method of claim 1, wherein a relation between a transmission of the first RS and a transmission of the second RS is implicitly dependent on a point in time when the first and second RSs are transmitted.

15. A user equipment (UE) comprising:
    a receiver;
    a transmitter;
    a processor; and
    a memory storing instructions executable by the processor to:
    receive, using the receiver, a first reference signal (RS) from at least one transmit antenna port;
    perform channel estimation based on the first RS;
    obtain an indication that the first RS and a second RS share a multi-dimensional spatial property;
    receive, using the receiver, the second RS from a second transmit antenna port;
    infer the shared multi-dimensional spatial property for the second RS; and
    perform channel estimation based on the second RS using the inferred multi-dimensional spatial property.

16. The UE of claim 15, wherein the receiver is a multi-antenna receiver.

17. The UE of claim 15, wherein the receiver is equipped with more than one antenna element which is controllable in an analog domain, a digital domain, or both.

18. The UE of claim 15, wherein the channel estimation based on the second RS includes duplicating a partial result of the channel estimation on the first RS.

19. The UE of claim 15, wherein the channel estimation based on the second RS includes omitting a processing or measurement activity performed on the first RS.

20. The UE of claim 15, wherein the channel estimations based on the first and second RSs are performed jointly.

21. The UE of claim 15, wherein:
the channel estimation based on the first RS comprises determining a value of a parameter representing a spatial property of a receiver; and
the second RS is received while reusing the value.

22. The UE of claim 15, wherein:
the channel estimation based on the first RS comprises generating an estimation filter based on the shared at least one spatial property; and
the channel estimation based on the second RS comprises applying the generated estimation filter.

23. The UE of claim 15, wherein the indication is a co-location indication or a quasi-co-location indication.

24. The UE of claim 15, wherein the indication is carried in a messaged received from a network node.

25. The UE of claim 15, wherein the indication is pre-agreed.

26. The UE of claim 15, wherein the at least one spatial property is selected from:

a channel correlation parameter;
a spatial correlation matrix of the channel;
a receiver-side spatial correlation matrix of the channel;
a factor of a spatial correlation matrix;
a matrix factor of a spatial correlation matrix;
a linear combination elements of a spatial correlation matrix;
a non-scalar property;
a metric representing a receive beam weight configuration; and
a subset or a linear combination of the spatial channel correlation.

27. The UE of claim 15, wherein the first RS is a synchronization signal or a signal to be used for CSI determination and the second RS is a signal to be used for CSI determination.

28. The UE of claim 15, wherein a relation between a transmission of the first RS and a transmission of the second RS is implicitly dependent on a point in time when the first and second RSs are transmitted.

* * * * *